United States Patent
Bender

(10) Patent No.: US 7,690,129 B2
(45) Date of Patent: Apr. 6, 2010

(54) EASY CENTERING HANGING LEVEL

(76) Inventor: James Jacob Bender, 1209 Kiefer Springs Ct., Ballwin, MO (US) 63021

( * ) Notice: Subject to any disclaimer, the term of this patent is extended or adjusted under 35 U.S.C. 154(b) by 0 days.

(21) Appl. No.: 12/074,517

(22) Filed: Mar. 4, 2008

(65) Prior Publication Data

US 2008/0271330 A1 Nov. 6, 2008

Related U.S. Application Data

(60) Provisional application No. 60/927,767, filed on May 4, 2007.

(51) Int. Cl.
*G01B 3/02* (2006.01)
*G01D 21/00* (2006.01)

(52) U.S. Cl. .............................. 33/613; 33/451; 33/520

(58) Field of Classification Search .................. 33/613, 33/451, 459, 520, 644
See application file for complete search history.

(56) References Cited

U.S. PATENT DOCUMENTS

| | | | | |
|---|---|---|---|---|
| 1,143,256 A * | 6/1915 | Dewees | ........................ | 33/451 |
| 1,210,370 A * | 12/1916 | Dvorak | ........................ | 33/341 |
| 2,559,961 A * | 7/1951 | Howell | ........................ | 33/374 |
| 2,816,366 A * | 12/1957 | Barlow | ........................ | 33/644 |
| 4,241,510 A * | 12/1980 | Radecki | ........................ | 33/613 |
| 4,326,339 A * | 4/1982 | Marino | ........................ | 33/520 |
| 4,607,437 A * | 8/1986 | McSorley et al. | ............. | 33/374 |
| 4,648,185 A * | 3/1987 | Brandimarte | ................ | 33/669 |
| 5,103,573 A * | 4/1992 | Ehling et al. | .................. | 33/613 |
| 6,029,362 A * | 2/2000 | Miodragovic | ................ | 33/666 |
| 6,305,093 B1 * | 10/2001 | Venola | ........................ | 33/451 |
| 6,357,716 B1 * | 3/2002 | Kratish et al. | ................ | 248/466 |
| 6,421,928 B1 * | 7/2002 | Miller | ........................ | 33/520 |
| 6,463,666 B1 * | 10/2002 | Szumer | ........................ | 33/484 |
| 6,467,179 B1 * | 10/2002 | Wolf | ............................ | 33/474 |
| 6,473,983 B1 * | 11/2002 | Gier | ............................ | 33/613 |
| 6,643,942 B1 * | 11/2003 | Russell | ........................ | 33/459 |
| 6,785,977 B1 * | 9/2004 | Crichton | ........................ | 33/613 |
| 7,210,243 B2 * | 5/2007 | Schmidt et al. | ............... | 33/613 |
| 2001/0013176 A1 * | 8/2001 | Ruther | ........................ | 33/451 |
| 2002/0078583 A1 * | 6/2002 | Richardson | .................. | 33/613 |
| 2002/0095812 A1 * | 7/2002 | Newman | ..................... | 33/613 |

* cited by examiner

*Primary Examiner*—Christopher W Fulton

(57) ABSTRACT

The present invention is an object hanging device, comprising an elongated body and a scale on the elongated body. The elongated body having a middle section. The scale has a zero point that is located within the middle section of the elongated body. The scale includes right measuring units to the right of the zero point and left measuring units to the left of the zero point. The right measuring units and the left measuring units increase away from the zero point.

18 Claims, 3 Drawing Sheets

Fig. 2

EASY CENTERING HANGING LEVEL

RELATED APPLICATIONS

The present application claims priority to U.S. Provisional Application Ser. No. 60/927,767, filed on May 4, 2007, entitled "Easy Centering Hanging Level," which is herein incorporated by reference in its entirety.

FIELD OF THE INVENTION

The present invention relates generally to a level and measuring device that eases the hanging of pictures, shelves and other objects, especially for hanging objects that need more than one hook to hold securely, by finding centering points easier

BACKGROUND OF THE INVENTION

Larger and heavier pictures and other hanging objects are manufactured with two looped hooks on the back to help distribute the weight evenly across the frame. Due to the difficulty and lack of system to hang the object using the supplied loops, some will connect the multiple loops with items such as picture wire. This does not solve the problem of the weight distribution. The wire also creates problems with wire stretch when deciding on height, along with the angling downward and hanging away from the wall. The hanging object then hanging by only one anchored hook is still easily knocked off center by any simple touch. Also, the single anchor never completely provides confidence that it will hold up safely and securely, especially on heavier objects.

For people who are willing to try using the two supplied loops on the back, the task is much more difficult than it needs to be. The tools needed to complete this task often include a calculator, a large level, a tape measure, a hammer and a pencil. To accomplish this, all tools listed above must be used more than once to determine a position of the two anchored hooks. The slightest miscalculation will result in the hooks not lining up and a second try is necessary. When starting with fractioned numbers, the need to find the center of a fractioned number can sometimes be difficult and imprecise.

As such, a need exists for a simple tool that can accurately hang large objects without having to locate and use the various stated tools listed above. Further, it is preferred that the tool is light and easy to store, and useable for everyday projects.

SUMMARY OF THE INVENTION

An object hanging device comprises an elongated body and a scale on the elongated body. The elongated body has a middle section. The scale has a zero point that is located within the middle section of the elongated body. The scale includes right measuring units to the right of the zero point and left measuring units to the left of the zero point. The right measuring units and the left measuring units increase upwardly from the zero point.

Stated alternatively, an object hanging device comprises an elongated body having a centering point and a scale. The scale has indicia located on the elongated body. The scale has a zero point that generally coincides with the centering point of the elongated body. The indicia to the right of the zero point increases by a measuring unit that is the same as the indicia to the left of the zero point. The object hanging device may have two different scales that increase away from the zero point. Preferably, the object hanging device includes a horizontal bubble level and a vertical bubble level.

The level is made to ease the problems of hanging objects with two or more supplied loops, while also using a centering system that is set up to take the math out of centering. The level uses a system of having the zero in the center of the measuring device with both sides counting outward from the zero point. The center is then easily found by placing the measuring device on the object and making sure the same number is on each of the outside points showing that zero is the exact distance between the two points. No longer will someone need to divide fractions to find a centering point.

The level is made to have all needed hanging items in one simple tool. It preferably combines both a vertical bubble level, a horizontal bubble level, a measuring tape, thereby removing the need for a calculator. The level is preferably folded, light weight, and able to be kept in any standard size drawer, as opposed to large levels that are kept in a larger work areas or near workbenches.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
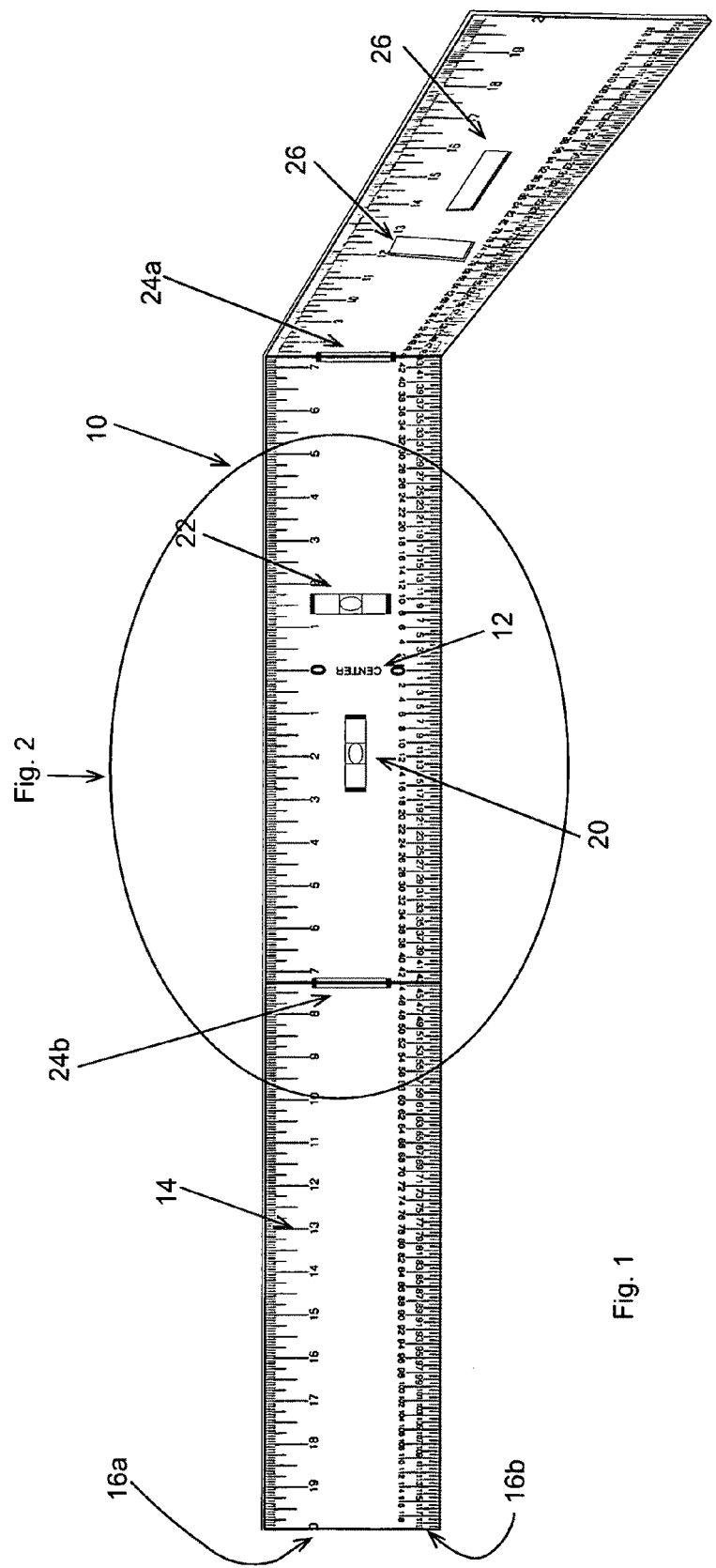
FIG. 1 illustrates a level according to the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Figure 2:
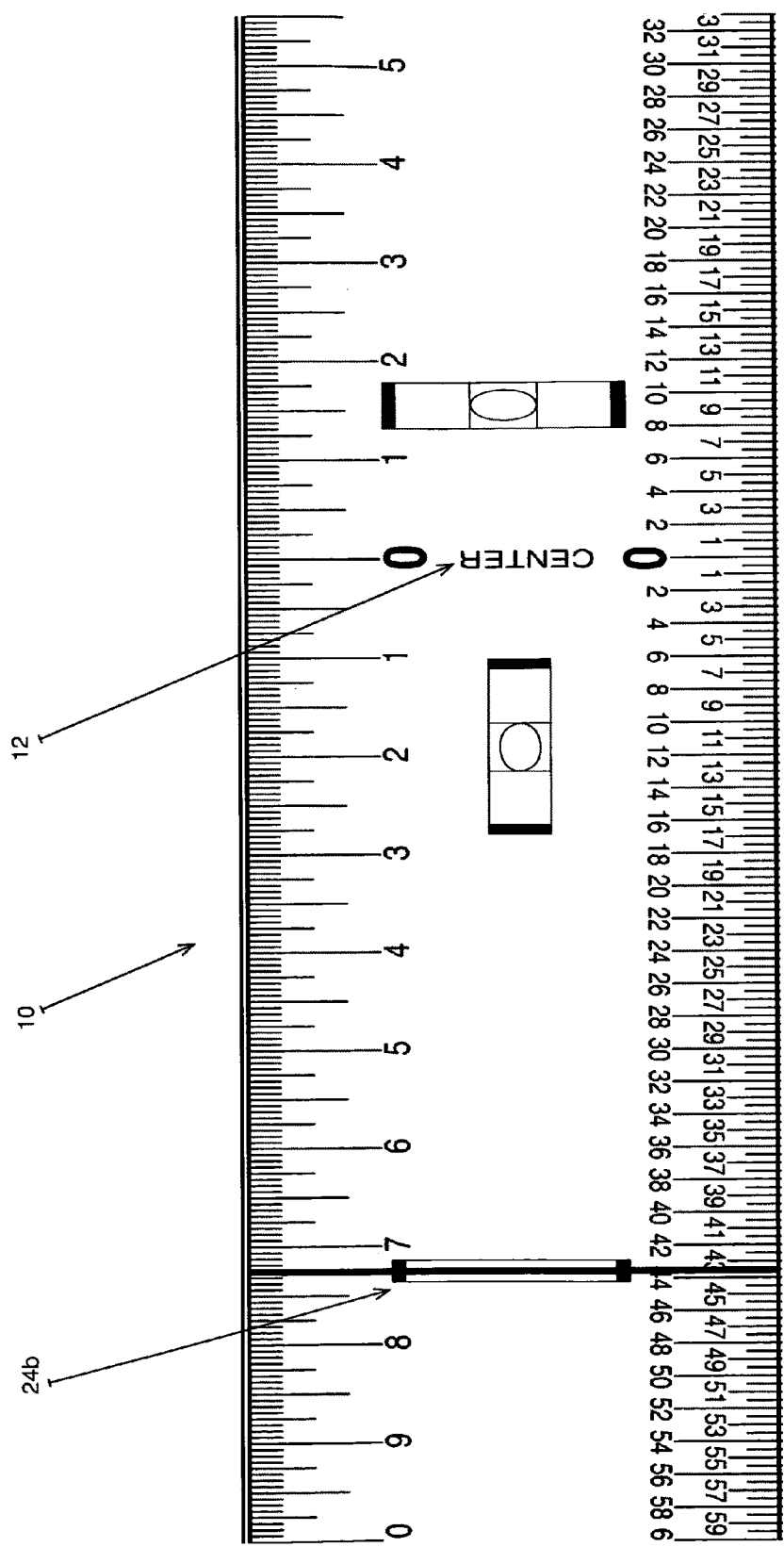
FIG. 2 illustrates an exploded view of the level of FIG. 1.

FIGS. 1 and 2 illustrates a level 10 according to the present invention. The level 10 includes a centering point 12 that is located at the middle section of the level 10. The level 10 further includes indicia 14 for measurement according to commonly known measuring scale (e.g., metric units or British units) or any other measuring scale (e.g. pica-based rule). The indicia 14 typically include a plurality of lines and numbers associated with the lines, as is common on rulers or other measuring devices.

As shown, the level 10 includes two scales 16a and 16b. The first scale 16a measures in British units (i.e. inches) and the second scale 16b measure in increments that cover very small distances to provide more accuracy for the hanging process, which is discussed further below. As an example, the increments (and their associated numbers) may be spaced away from each by ⅙ of an inch or less (and perhaps with half marks between each numbered increment). Each measuring scale 16 has its zero point in the middle section, generally aligned with the centering point 12 of the level 10. The indicia 14 are numbered in the same manner moving outwardly left and right from the centering point 12. As such, the measuring scale 16 preferably provides a mirror image centered around the centering point 12.

The level 10 also includes a horizontal bubble 20 and a vertical bubble 22. This allows the level 10 to be used against a surface (e.g., a wall) in a manner that is substantially horizontal or substantially vertical. The horizontal bubble 20 is especially useful for the hanging process described below.

The level 10 preferably includes at least one hinge 24 to allow the level 10 to be folded. As shown, the level 10 includes two hinges 24a and 24b. The first hinge 24a allows the right section to be folded over the middle section. The right section preferably includes two cut-outs 26 that fit over the horizontal bubble 20 and the vertical bubble 22. The second hinge 24b folds forward as well, but may fold to the back side of the level 10. Instead of the hinges 24, fold lines can be placed on the elongated body of the level 10 if it is made from bendable or foldable material. Further, the left and right sections of the level 10 could slide outwardly from the center section, keeping the consistent centering point.

The level 10 is preferably made from thin plastic material, vinyl, or paper. The system can further include a plastic sleeve into which the folded level 10 is placed for storage.

In another embodiment, the two scales 16a and 16b (or the background of the level around the scales 16a and 16b) can include further indicia to assist the user in easily recognizing a general area on the level 10 when starting the measurement process to get the user in close vicinity of the desired numbered indicia 14 on both sides of scales 16a and 16b. For example, the units of measurement on the scales 16a and 16b from the zero point to the "3" unit on both scales can be the same color (e.g., orange), the next range of units from the "3" unit to the "6" unit can be a different color (e.g., blue), and the next range of units from the "6" unit to the "9" unit can be yet a different color (e.g., red). Thus, when the number of units on each scale 16a, 16b is large, the multiple colors allow the user to quickly identify the general area on the level 10 at which the hooks of the object (e.g., picture hooks) should be placed (i.e., the user will know to place a left hook in one red area of units on the left scale 16a and the red zone of the right scale 16b by matching colors to get a starting point for the desired units that will perfectly hand the picture). Other types of indicia to assist the user in finding the general area that encompasses the desired units of measurement include different fonts to the units, different font sizes to the units, different colored units, and different colored background patterns.

Figure 3B:
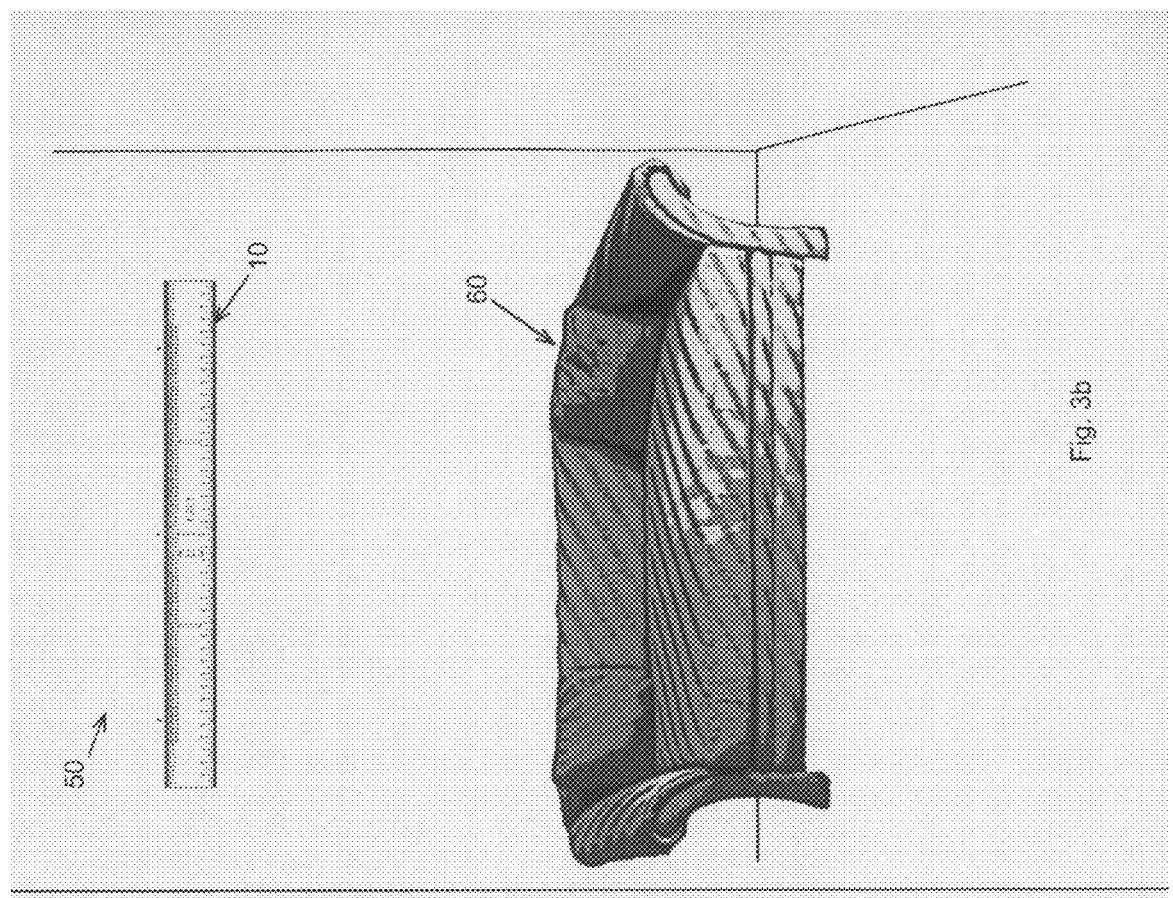
FIG. 3a and FIG. 3b illustrate the system of hanging a picture using the level of FIGS. 1 and 2.
Figure 3A:
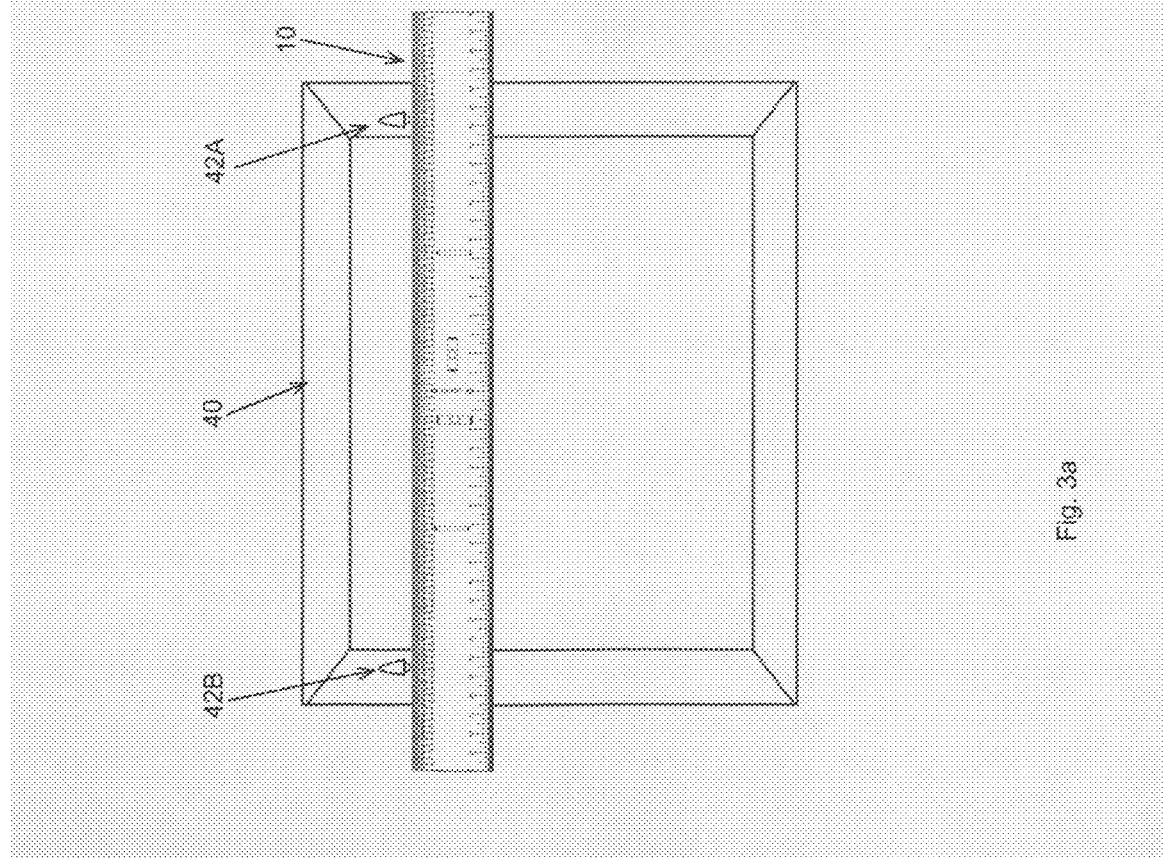

FIGS. 3a and 3b describe the level 10 being used to hang a large picture 40 on a wall 50 such that the picture 40 is centered above an object, which as shown is a couch 60. As shown first in FIG. 3a, the level 10 is placed on the back of the picture 40. The picture 40 has two hooks 42a and 42b. The level 10 is placed on the picture 40 such that the number on the scale 16 is the same at the left hook 42b and at the right hook 42a. For example, the left hook 42b is adjacent number (i.e., indicia) "70" on the scale 16 and the right hook 42a is adjacent number (i.e. indicia) "70" on the scale 16, such that the centering point 12 (i.e. the zero point) is substantially at the center of the picture 40. Next, the center of the object (e.g., a couch 60 in FIG. 3b) or the center location on the wall 50 is located. The level 10 is also useful for finding this center point of the object so as to mark it on the wall 50. Once found, the level 10 can be used to vertically raise the mark to the desired height, which is aided by the use of the vertical bubble 22. Once raised, the final centering mark will be the center point on the object and at the correct height.

Finally, the level 10 is placed against wall 50 with the centering point 12 (i.e., zero point) on the final centering mark, and two marks are placed on the wall 50 at the locations of the measured scale units. In this example for the picture 40, two marks are placed on the wall 50 at the left and right numbers (i.e., indicia) "70" on the scale 16, which correspond to the earlier measured rear pictures hooks 42. Any wall anchors, such as screws, nails, hooks, dry-wall anchor bolts, etc., can be placed at the two marks. The picture 40 can then be precisely hung on the wall 50 above the couch 60 via the wall anchors engaging the hooks 42 on the picture 40.

What is claimed is:

1. An object hanging device, comprising:
    an elongated body being made of a thin plastic material and having a centering point, the elongated body including a first cut-out extending entirely through the thin plastic material of the elongated body;
    a scale having indicia located on the elongated body, the scale having a zero point that generally coincides with the centering point of the elongated body, the indicia to the right of the zero point increasing by a measuring unit that is the same as the indicia to the left of the zero point;
    at least one horizontal bubble level fixed to the elongated body and protruding outwardly away from an exterior surface of the elongated body; and
    at least one hinge along the elongated body separating the elongated body into a first section and a second section, the elongated body being foldable around the at least one hinge such that the horizontal bubble level is received by and fits within the first cut-out on the elongated body when the first and second sections are positioned against each other after being folded around the hinge.

2. The object hanging device of claim 1, wherein the plastic material is vinyl.

3. The object hanging device of claim 1, wherein the at least one hinge includes a first hinge and a second hinge such the elongated body includes a third section and is folded twice to reduce its size, the second section being positioned between and against the first and third sections after the elongated body is folded twice around the hinges.

4. The object hanging device of claim 3, further including a vertical bubble level fixed to the elongated body and wherein the elongated body further includes a second cut-out extending entirely through the thin plastic material of the elongated body for receiving the vertical bubble level when the elongated body is folded.

5. The object hanging device of claim 3, further including a sleeve into which the object hanging device can be placed after being folded twice.

6. The object hanging device of claim 1, further including at least one vertical bubble level within the elongated body and the elongated body further includes a second cut-out extending entirely through the thin plastic material of the elongated body for receiving the vertical bubble level when the elongated body is folded.

7. The object hanging device of claim 1, wherein the indicia to the right and left of the zero point continuously increment upward from the zero point.

8. The object hanging device of claim 1, wherein the scale has adjacent measuring units that are spaced by an amount that is less than 1/6 of an inch.

9. An object hanging device, comprising:
    an elongated body having a middle section located between a first end and a second end, the elongated body including a first cut-out and a second cut-out;
    a first scale having a zero point that is located within the middle section of the elongated body, the first scale including first right measuring units to the right of the zero point and first left measuring units to the left of the zero point, the first right measuring units and the first left measuring units increasing away from the zero point;

a second scale having a second zero point that is located within the middle section of the elongated body, the second scale including second right measuring units to the right of the second zero point and second left measuring units to the left of the second zero point, the second right measuring units and the second left measuring units increasing away from the second zero point;

a vertical bubble level within the elongated body and protruding outwardly away from an exterior surface of the elongated body;

a horizontal bubble level within the elongated body and protruding outwardly away from the exterior surface of the elongated body;

a first hinge located on the elongated body at a distance from the first end that is equal to approximately ⅓ of the overall length of elongated body;

a second hinge located on the elongated body at a distance from the second end that is equal to approximately ⅓ of the overall length of elongated body, the first and second hinges defining first, second and third segments along the elongated body; and the elongated body being foldable around the first hinge and the second hinge such that (i) the horizontal bubble level fits within the first cut-out and the vertical bubble level fits within the second cut-out when the elongated body is folded around the first and second hinges and (ii) the second segment of the elongated body is positioned against the first and third segments when the elongated body is folded around the first and second hinges.

10. The object hanging device of claim 9, further including a sleeve into which the folded elongated body is placed after being folded around the first and second hinges.

11. The object hanging device of claim 10, wherein the elongated body is made of a thin plastic material.

12. The object hanging device of claim 9, wherein the zero point and the second zero point are positioned within the middle section at the same horizontal location, and adjacent ones of the second left measuring units and adjacent ones of the second right measuring units are spaced by an amount that is less than ⅙ of an inch.

13. The object hanging device of claim 9, wherein the elongated body is made of plastic, paper, or vinyl material.

14. The object hanging device of claim 9, wherein the first right measuring units and the first left measuring units incrementally increase from zero away from the zero point.

15. A method of hanging an object on a wall with an object hanging device, the object hanging device having a scale with a zero point that is located within a middle section of the object hanging device, the scale including right measuring units to the right of the zero point and left measuring units to the left of the zero point, the right measuring units and the left measuring units increasing away from the zero point, the object including two hooks for holding the object on the wall, the object hanging device including at least one hinge and being foldable, the method comprising:

prior to the steps below, unfolding the object hanging device from around the at least one hinge;

placing the object hanging device against the object such that the two hooks are located substantially adjacent to the same measuring unit on the right measuring units and the left measuring units so as to define the desired measured units;

placing the object hanging device against the wall at a location at which the zero point is generally located at the center point on the wall for the object to be hung, wherein the placing of the object hanging device against the wall includes leveling the object hanging device on the wall with a bubble leveling system on the object hanging device;

marking the wall at locations corresponding to the desired measured units on the object marking device;

attaching wall anchors in the wall at the marked locations; and after attaching the wall anchors, folding the object hanging device such that a bubble level within the bubble leveling system fits within a corresponding cut-out that extends entirely through the object hanging device, the cut-out being located on an adjacent folded segment of the object hanging device relative to the bubble level.

16. The method of claim 15, further including affixing the two hooks of the object to the wall anchors.

17. The method of claim 15, wherein the object hanging device is made of plastic, paper, or vinyl material.

18. The method of claim 15, wherein marking the wall includes using the right measuring units and the left measuring units, the right measuring units and the left measuring units incrementally increase from zero away from the zero point.

* * * * *